(12) United States Patent
Voutour et al.

(10) Patent No.: US 8,538,872 B1
(45) Date of Patent: *Sep. 17, 2013

(54) CREDIT CARD ACCOUNT SHADOWING

(75) Inventors: Teddy Joseph Edmond Voutour, Helotes, TX (US); Charles Lee Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,603

(22) Filed: Mar. 27, 2012

Related U.S. Application Data (60) Continuation of application No. 12/252,097, filed on Oct. 15, 2008, now Pat. No. 8,145,565, which is a division of application No. 12/143,224, filed on Jun. 20, 2008, now abandoned.

(51) Int. Cl.
*G06Q 40/00* (2012.01)

(52) U.S. Cl.
USPC ............... 705/39; 705/36 R; 705/38; 705/40

(58) Field of Classification Search
USPC ................................. 705/35, 38, 40
See application file for complete search history.

(56) References Cited

U.S. PATENT DOCUMENTS

| | | | |
|---|---|---|---|
| 5,727,249 A | 3/1998 | Pollin | |
| 6,505,171 B1* | 1/2003 | Cohen et al. | 705/26.41 |
| 2002/0062279 A1* | 5/2002 | Behrenbrinker et al. | 705/39 |
| 2002/0069122 A1* | 6/2002 | Yun et al. | 705/26 |
| 2005/0097033 A1 | 5/2005 | Pretell et al. | |
| 2006/0253388 A1* | 11/2006 | Newton | 705/39 |
| 2006/0277139 A1* | 12/2006 | Poltorak | 705/38 |
| 2007/0120065 A1 | 5/2007 | Takane et al. | |
| 2007/0130065 A1* | 6/2007 | Staab et al. | 705/39 |
| 2007/0168265 A1* | 7/2007 | Rosenberger | 705/30 |
| 2008/0027844 A1* | 1/2008 | Little et al. | 705/35 |
| 2008/0103972 A1* | 5/2008 | Lanc | 705/44 |

FOREIGN PATENT DOCUMENTS

| | | |
|---|---|---|
| EP | 2017779 | 1/2009 |
| EP | 2017779 A2 * | 1/2009 |

OTHER PUBLICATIONS

The Internet Ace—Credit Card Transfers. "Automated credit Card Balance Transfers" http://www.credit-card-transfers.com/. Mar. 16, 2008.*

Bruene, J. "Online Balance Poaching: E Trade Mileage Maximizer Account", netbanker [ Tracking online finance. Dec. 7, 2005. http //www.netbankercom/2005/12/online-poaching-etrade-mileage-max..>.*

(Continued)

*Primary Examiner* — William Rankins
(74) *Attorney, Agent, or Firm* — Brooks, Cameron & Huebsch, PLLC (57) ABSTRACT

Account shadowing is provided such that when a charge is made on a first credit card (e.g., a high interest rate credit card) of a user, a transfer of funds is made from a second credit card (e.g., a low interest rate credit card) of the user to pay the charge made to the first credit card. This may transfer the balance from a user's high interest rate credit card to a user's low interest rate credit card. In this manner, the user may receive the reward incentives of a high interest rate credit card while using a low interest rate credit card to satisfy balances due.

17 Claims, 5 Drawing Sheets

(56) References Cited

OTHER PUBLICATIONS

Bruene, J. "Online Balance Poaching: E*Trade's Mileage Maximizer", nerbanker- Tracking Online Finance. Dec. 7, 2008. Retreived from the internet <http://www.nerbanker.com/2005/12/online-poaching-etrade-mileage-max . . .>. 3 pgs.

Trade Financial, "E*TRADE Mileage Maximizer Account", Retrieved from the internet <https://us.etrade.com/e/t/jumppage/viewjumppage?PageName=mileagemax>. 1 pg. Mar. 16, 2008.

The Internet Ace-Credit Card Transfers, "Automated Credit Card Balance Transfers", Retreived from the internet <http://www.credit-card-transfers.com/>. 4 pgs. Mar. 16, 2008.

* cited by examiner

CREDIT CARD ACCOUNT SHADOWING

CROSS-REFERENCE TO RELATED APPLICATIONS

The present application is a continuation of U.S. patent application Ser. No. 12/252,097, filed on Oct. 15, 2008, now U.S. Pat. No. 8,145,565, which is a divisional of U.S. patent application Ser. No. 12/143,224, filed Jun. 20, 2008, the entirety of which is hereby incorporated by reference herein. Further, this application is related by subject matter to that disclosed in the following commonly assigned application, the entirety of which is hereby incorporated by reference herein: U.S. patent application Ser. No. 12/252,106, filed on Oct. 15, 2008.

BACKGROUND

A credit card is a system of payment in which money is not removed from the credit card user's account after every transaction. A credit card issuer, which may be a bank or an entity associated with a bank, lends money to the user to be paid to a vendor. An interest rate is associated with the money lent to the user. Credit card issuers usually waive interest charges if the balance is paid in full each month, but typically will charge full interest on the entire outstanding balance from the date of each purchase if the total balance is not paid.

Because of intense competition in the credit card industry, credit card issuers often offer incentives such as frequent flyer points, gift certificates, or cash back to try to attract users to their program. Credit cards that offer attractive incentives often have high interest rates, and credit cards with low interest rates often lack attractive incentives.

SUMMARY

Account shadowing is provided such that when a charge is made on a first credit card (e.g., a high interest rate credit card) of a user, a transfer of funds is made from a second credit card (e.g., a low interest rate credit card) of the user to pay the charge made to the first credit card. This may transfer the balance from a user's high interest rate credit card to a user's low interest rate credit card. In this manner, the user may receive the reward incentives of a high interest rate credit card while using a low interest rate credit card to satisfy balances due.

In an implementation, a payment may be made to the first credit card issuer using an account or other funding source associated with the user, such as a checking account or equity line of credit, instead of a second credit card. Alternatively, a portion of the payment may be made to the first credit card issuer using an account or other funding source and another portion of the payment may be made using the second credit card.

In an implementation, a transfer may be performed with respect to a balance on the first credit card with payments made periodically or may be performed with respect to a particular balance. Alternatively or additionally, the user may select certain types of transactions for the balance transfer, such as purchases made from a particular vendor or purchases of a certain product or corresponding to a particular merchant category code (MCC).

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

A balance transfer describes any shifting or moving of either an asset or debt from one account to another. With respect to credit cards, a balance transfer is the act of transferring debt from one credit card to another. A balance transfer may be initiated when one credit card has better terms and rates than another credit card having an existing balance.

Figure 1:
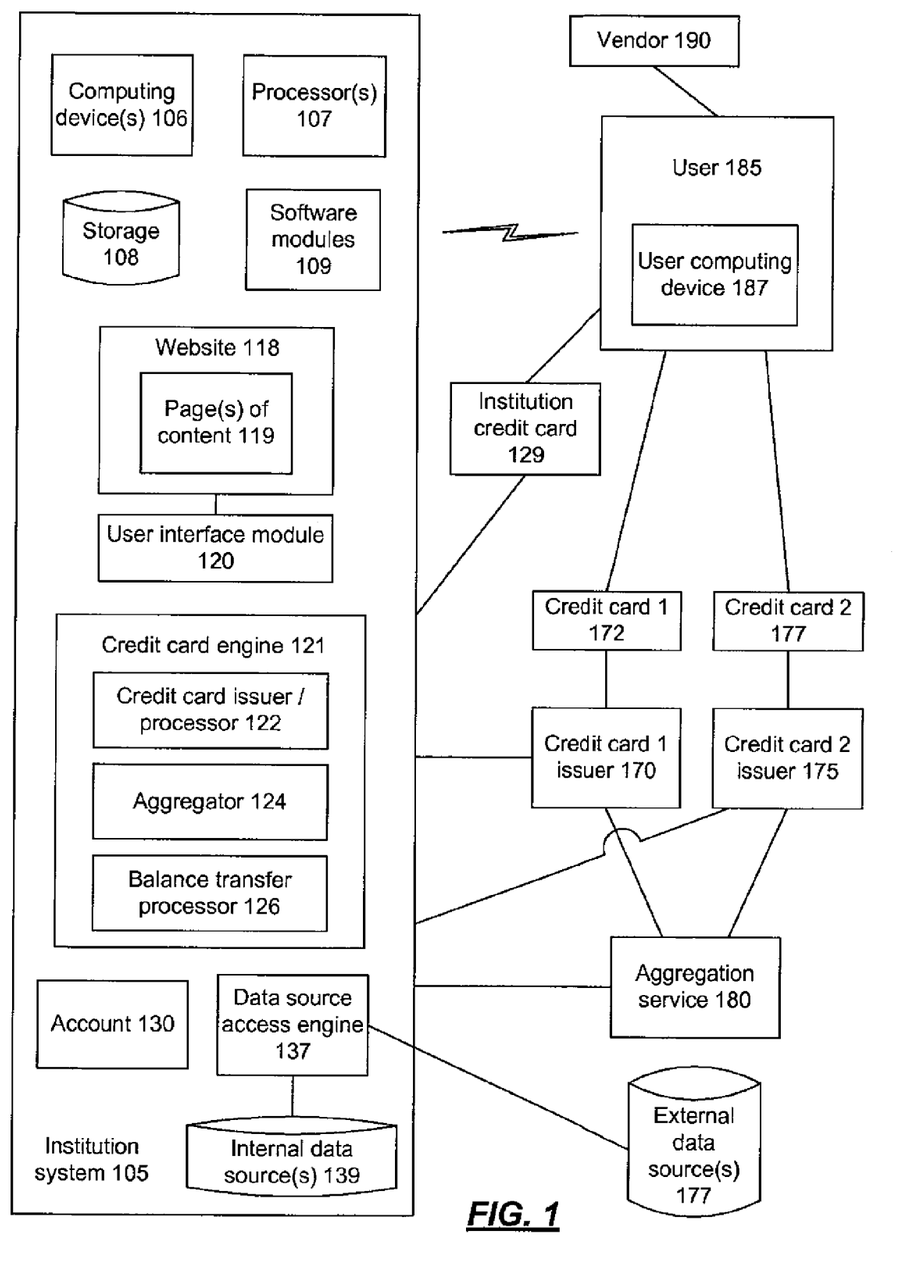
FIG. 1 is a block diagram of an implementation of a system that may be used to provide credit card account shadowing.

FIG. 1 is a block diagram of an implementation of a system that may be used to provide credit card account shadowing. An institution system 105 may be associated with an institution which may be any type of entity capable of issuing and/or processing credit cards and/or providing funds associated with credit cards. For example, the institution may be a financial services institution, a credit card association or member of a credit card association, a retail bank, an investment bank, an investment company, etc.

The institution system 105 may shadow a credit card of a user 185, such as a high interest rate credit card, with a second credit card of the user 185, such as a low interest rate credit card, and transfer the balance to the second credit card, as described further herein. A credit card may also be shadowed by other accounts, such as a checking account, an equity line of credit, etc., giving the user 185 the ability to take advantage of incentives on high interest rate credit cards without accruing the interest associated with them. As described herein, the user 185 may be notified and authorize a balance transfer, or the user 185 may have the balance transfer automatically performed without authorization.

The user 185 and an associated user computing device 187 are shown, along with a vendor 190 and credit card issuer 1 170 and credit card issuer 2 175. Credit card issuer 1 170 may issue a credit card 1 172 and credit card issuer 2 may issue a credit card 2 177. A credit card issuer may process transactions associated with a credit card and/or may be an entity that provides services pertaining to aspects and behaviors of credit cards. It is contemplated that the institution system 105 may handle such aspects and/or behaviors of credit cards. Although only two credit card issuers are shown, each with a respective credit card, it is contemplated that any number of credit card issuers and credit cards may be implemented. In an implementation, the institution system 105 may issue a credit card, referred to as an institution credit card 129.

The user 185 may make a purchase from the vendor 190 using one of the credit cards. As described further herein, the institution system 105 may monitor credit cards and purchases made on credit cards, and may receive and analyze transaction data associated with purchases made on credit cards. The institution system 105 may also obtain balances, available credit limits, and interest rates of credit cards, and initiate balance transfers and payments of balances in full or portions thereof.

The institution system 105 may use account aggregation, via an aggregator 124 and/or an aggregation service 180 (e.g., Yodlee, Intuit, etc.), to compile information from the various credit card accounts, bank accounts, investment accounts, and other user, vendor, or credit card issuer accounts.

The institution system 105 may access one or more internal data sources 139 and/or one or more external data sources 177 when obtaining information. The internal and external data sources 139 and 177 may be accessed via a data source access engine 137. "Screen scraping" may be used in which the user 185 provides the requisite account-access information for the institution system 105 to gather and compile the information. Thus, data pertaining to the user 185, the user's credit cards, and/or user account(s) such as account 130 may be retrieved from the internal data source(s) 139 and/or the external data source(s) 177. Other information may be provided to the institution system 105 from the user 185 and/or the vendor 190. The retrieved data may be stored centrally, perhaps in storage 108. As described further herein, a credit card engine 121 has access to data, files, and documents pertaining to the user 185 as well as any other data, files, and documents that are currently stored by the institution system 105 as well as external data, files, and documents and that may be useful in transferring balances.

The institution system 105 may send a notice to the user 185, e.g. via email, instant messaging, telephone, facsimile, mail, etc., asking if the user 185 would like a balance transferred from one credit card to another and/or notifying the user 185 that a balance transfer has been initiated and/or has been performed. The notice may be sent to a computing device associated with the user 185, such as the user computing device 187.

The institution system 105 may include a user interface module 120, the credit card engine 121, and the data source access engine 137. The user interface module 120 may generate and format one or more pages of content 119 as a unified graphical presentation that may be provided to the user computing device 187 as an output from the credit card engine 121. In an implementation, the page(s) of content 119 may be provided to the user computing device 187 via a secure website 118 associated with the institution system 105.

In an implementation, instead of hosting the website 118, the institution system 105 may comprise a conventional application server hosting a proprietary online service accessible only by a private network. In any event, the institution system 105 may have appropriate security mechanisms in place to prevent unauthorized third parties from intercepting the user's information.

The user 185 may be an individual who owns a credit card account or other account 130 that may be provided by or held by the institution associated with the institution system 105. The user 185 may provide data and/or instructions to the institution system 105 via the user computing device 187. The user computing device 187 may be a handheld computing device such as a personal digital assistant (PDA) or a mobile phone, for example, or any type of personal computer (PC). The user computing device 187 and the institution system 105 may be connected over a network. The user 185 may communicate with the institution system 105 by way of a communications network such as an intra net, the Internet, a local area network (LAN), a wide area network (WAN), a wireless fidelity (WiFi) network, a public switched telephone network (PSTN), a cellular network, a voice over Internet protocol (VoIP) network, and the like. An example user computing device is described with respect to FIG. 5. The user 185 may also communicate with the institution system 105 by phone, email, instant messaging, facsimile, mail, and the like.

The vendor 190 may be any entity that may sell a product or a service to the user 185. The user 185, as well as the institution system 105 and the credit card issuers 170 and 175 may be in communication with the vendor 190 via a communications network. The vendor 190 may send data associated with the purchase, such as amount, vendor name, merchant category code (MCC), and credit card number, for example, to a credit card issuer for verification and processing. An MCC is a number assigned to a business and is used to classify the business by the type of goods or services it provides. The institution system 105 may have the ability to interact with information that may be maintained and/or provided by the vendor 190, e.g., information pertaining to purchases made by the user 185. Additionally, the credit card issuers 170 and 175 and the user 185 may be in communication with the institution system 105 via a communications network. Similarly, the credit card issuers 170 and 175, the aggregation service 180, and the institution system 105 may be in communication with each other via a communications network.

In an implementation, the user 185 may register one or more credit cards with the institution system, e.g., via the website 118. Alternatively, the user 185 may register the credit cards with the institution system 105 by any other electronic or physical techniques. Registration may include the user 185 identifying various credit cards and providing authorization credentials to allow the institution system 105 to access associated credit card information.

The credit card engine 121 may issue and process one or more credit cards of the user 185 issued by the institution system 105 (e.g., the institution credit card 129) using a credit card issuer/processor 122. The aggregator 124 may gather and maintain information pertaining to the credit cards of the user issued by the institution system and/or external entities such as the credit card issuer 1 170 and the credit card issuer 2 175. Any techniques for gathering and maintaining information may be used. As noted above, the aggregator 124 may retrieve information from internal data source(s) 139 and external data source(s) 177 by a data source access engine 137. The internal data source(s) 139 may contain data, metadata, email, files, and/or documents that the institution system 105 maintains pertaining to the user 185, such as personal data such as name, physical address, email address, etc., credit card data, account data, as well as other account information.

Additionally, the aggregator 124 may request and receive information pertaining to the credit cards, purchases, and/or items from the user 185 and/or the vendor 190. This information may be used in transfer of a balance. After retrieving or otherwise receiving information from the various sources, the aggregator 124 may provide the information to a balance transfer processor 126 and/or may store the information in storage, such as storage 108 or the internal data source(s) 139.

The balance transfer processor 126 may access the information and use tools and/or applications, for example, to analyze the information and initiate a balance transfer, as described further herein. The balance transfer processor 126 may also send a request to the user 185 requesting instructions regarding a balance transfer or other payment to a credit card. The balance transfer processor 122 may receive instructions from the user 185 and act on the instructions accordingly.

A user access system may be communicatively coupled to the credit card engine 121 and may be configured to send machine-readable instructions to the credit card engine 121. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to credit card and account data and status and related data can be accomplished. The user 185 may enter information into the web pages via a web browser on the user computing device 187. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein.

Examples of software modules 109 may include modules that may be used in conjunction with issuing and maintaining a credit card, generating web page content for display, receiving instructions pertaining to balance transfers from the user 185, and transferring balances, for example. While specific functionality is described herein as occurring with respect to specific modules, the functionality may likewise be performed by more, fewer, or other modules. An example computing device and its components are described in more detail with respect to FIG. 5.

Figure 2:
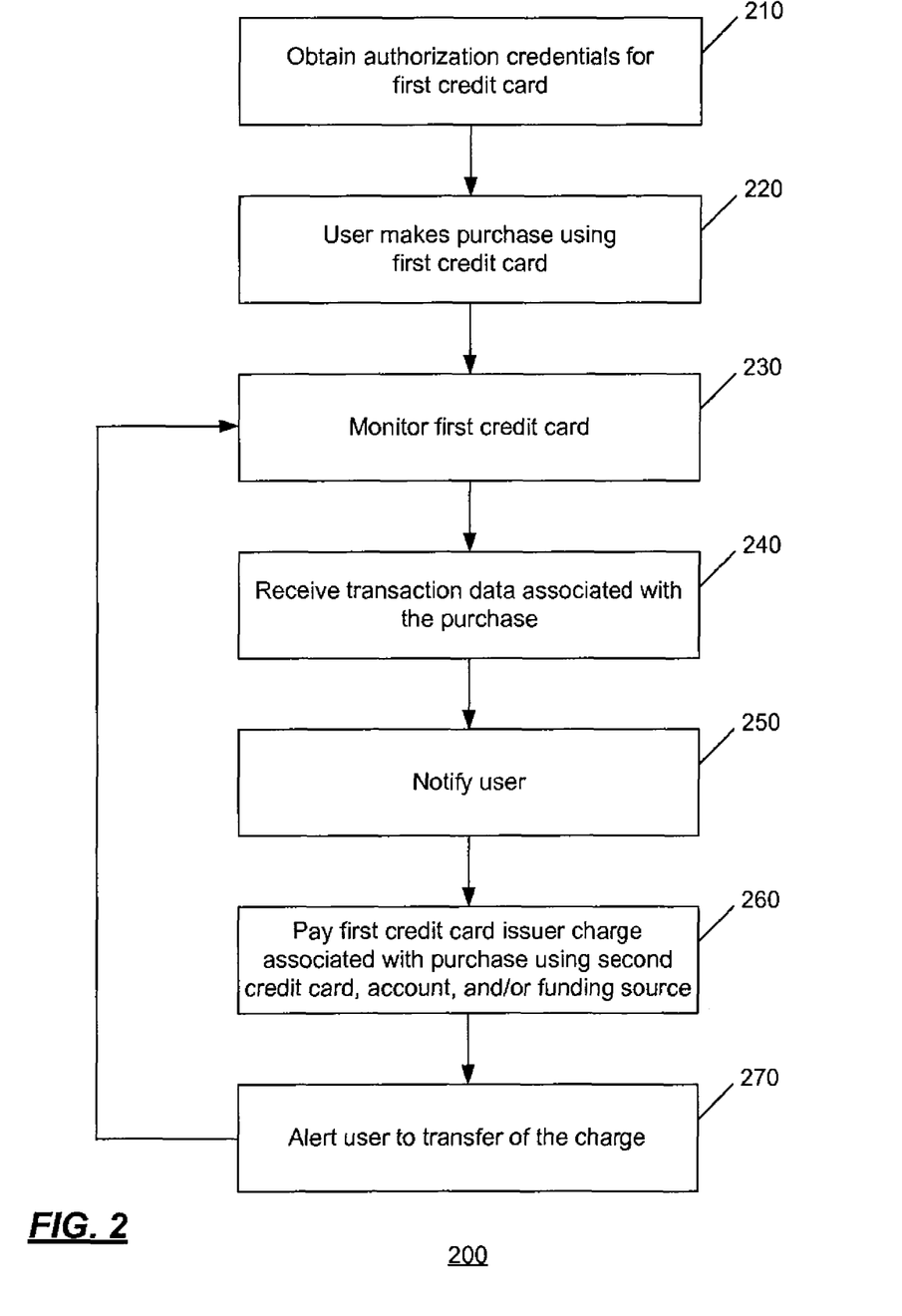
FIG. 2 is an operational flow of an implementation of a method that may be used to provide credit card account shadowing.

FIG. 2 is an operational flow of an implementation of a method 200 that may be used to provide credit card account shadowing. At 210, authorization credentials for a first credit card, which may be a higher interest rate credit card, may be obtained from the user or the credit card issuer. At 220, the user makes a purchase using the first credit card. The first credit card may be issued by any entity either associated with the institution system or not.

At 230, monitoring of the first credit card may be performed. The monitoring may be performed continuously or from time to time, such as periodically (e.g., daily, weekly, the closing date of the credit card billing cycle, the first day of each month, sometime during the credit card's grace period, etc.). In an implementation, the institution system may receive a notice of the purchase from the credit card issuer or the aggregation service. As noted above, the credit card issuer may be associated with the institution system or be a separate entity. Alternatively, the institution system may perform the monitoring by accessing the first credit card information, e.g., using the authorization credentials.

The institution system may receive transaction data associated with the purchase at 240, e.g., via the data source access engine and/or from the aggregation service or credit card issuer. The transaction data may comprise an amount of the purchase, for example. In an implementation, the institution system may have access to the transaction data because of a relationship the institution system has with the credit card issuer. Alternatively or additionally, the institution system may scrape the transaction data from a website associated with the credit card, provided the institution system has the appropriate credentials and/or authorization, e.g., provided by the user, the credit card issuer, etc.

Optionally, in an implementation, at 250, the user may be notified prior to the charge being transferred as described further herein. Notification may take place via a website, email, instant messaging, phone, facsimile, mail, etc. Additionally, the user may be provided with the option to accept the transfer of the charge or decline the transfer of the charge. If the user declines the transfer of the charge, the charge is not transferred and processing may end.

Assuming the user accepts the transfer of the charge or is not notified, the institution system may initiate a payment to the first credit card issuer to pay the charge associated with the purchase at 260. The payment may be made using a second credit card, which may be a lower interest rate credit card of the user, thereby transferring the charge for the purchase to the second credit card. The second credit card may be issued by any entity either associated with the institution system or not, and may be issued by the same entity as the first credit card or a different entity. The transfer may occur before interest accrues on the charge on the first credit card.

The transfer may be performed with respect to a balance on the first credit card with payments made periodically, such as weekly or monthly, or may be performed with respect to a particular balance, such as each time a purchase is made or when the balance reaches a certain amount such as $100, $500, $1000, etc. Alternatively or additionally, the user may select certain types of transactions (e.g., based on vendor, product, transaction size (e.g., greater than $500), etc.) for the balance transfer, such as purchases made from a particular vendor or purchases of a certain product or corresponding to a particular merchant category code (MCC). In this manner, the balance transfer may only take place if the charge is associated with a predetermined type of transaction data.

In an implementation, the payment may be made to the first credit card issuer using an account or other funding source associated with the user, such as a checking account or equity line of credit, instead of a second credit card. Alternatively, a portion of the payment may be made to the first credit card issuer using an account or other funding source and another portion of the payment may be made using the second credit card.

At 270, the user may be alerted to the transfer of the charge via a website, email, instant messaging, phone, facsimile, mail, etc. Monitoring of the first credit card may continue, with processing continuing at 230.

Although examples described herein may refer to transfer between credit cards of different interest rates, it is contemplated that shadowing may be performed such that transfers may occur between credit cards based on factors other than interest rates, such as from a user's spouse's credit card to the user's credit card or from a user's child's credit card to the user's credit card.

Figure 3:
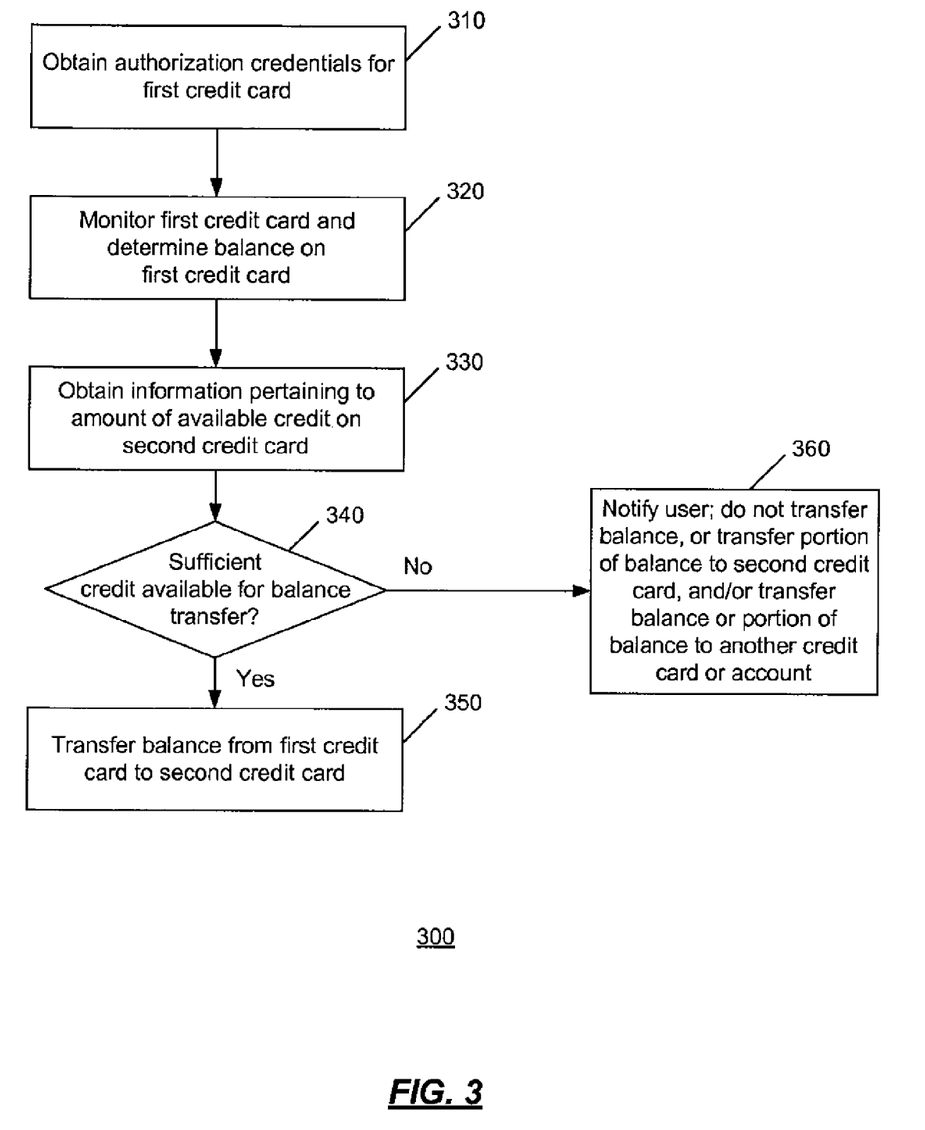
FIG. 3 is an operational flow of another implementation of a method that may be used to provide credit card account shadowing.

FIG. 3 is an operational flow of another implementation of a method 300 that may be used to provide credit card account shadowing. At 310, authorization credentials for a first credit card may be obtained similar to 210. At 320, monitoring may be performed similar to 230 and the balance on the first credit card may be determined.

At 330, information pertaining to an amount of available credit on a second credit card (e.g., a lower interest rate credit card than the first credit card) may be obtained. In an implementation, the institution system may obtain the information pertaining to the amount of available credit from the second credit card issuer or via the data source access engine. Alternatively or additionally, the institution system may scrape the information from a website associated with the credit card, provided the institution system has the appropriate credentials and/or authorization, e.g., provided by the user, the credit card issuer, etc.

At 340, the balance on the first credit card may be compared with the amount of available credit on the second credit card to determine if there is sufficient credit available for a balance transfer. If there is sufficient credit available, the balance may transferred from the first credit card to the second credit card at 350. In an implementation, the institution system may initiate a payment to the first credit card issuer to pay the balance, using similar techniques as those described at 260.

If there is insufficient credit available on the second credit card to pay the balance on the first credit card, the balance may not be transferred and the user may be notified at 360. A portion of the balance, e.g., up to the available credit limit, may be transferred to the second credit card. Alternatively or additionally at 360, the balance or a portion of the balance may be transferred to another credit card identified by the user. In an implementation, the user may provide instructions, e.g. via email, a website, instant messaging, facsimile, mail, etc., identifying an account (e.g., a checking account, an equity line of credit, etc.) with which to pay the balance or a portion of the balance. Thus, the balance or a portion of the balance from one credit card may be transferred among multiple other credit cards or accounts.

Figure 4:
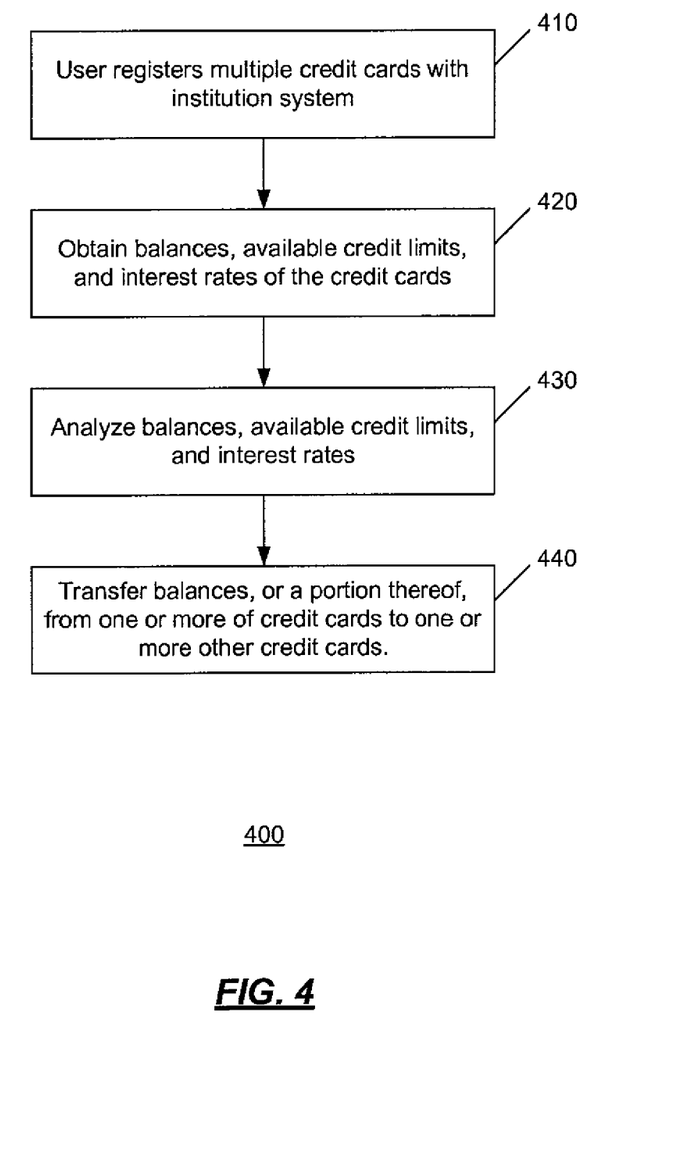
FIG. 4 is an operational flow of another implementation of a method that may be used to provide credit card account shadowing.

FIG. 4 is an operational flow of another implementation of a method 400 that may be used to provide credit card account shadowing. At 410, a user may register multiple credit cards with the institution system. For example, the user may identify multiple credit cards (e.g., account numbers) and/or provide authorization credentials to the institution system. The credit cards may be issued by the institution system and/or by third party credit card issuers.

At 420, the balances, available credit limits, and interest rates of the credit cards may be obtained, e.g., from the user, the credit card issuer(s), the aggregation service, by scraping the data from websites associated with the credit cards, provided the institution system has the appropriate credentials and/or authorization, e.g., provided by the user, the credit card issuer, etc.

At 430, the balances, available credit limits, and interest rates may be analyzed by the institution system. It may be determined which balances are on the credit card(s) with the higher or highest interest rate(s), and whether there is available credit on the credit card(s) with the lower or lowest interest rate(s).

At 440, the balances, or a portion thereof, may be transferred from one or more of the credit cards, such as the credit cards with higher interest rates, to one or more other credit cards, such as the credit cards with lower interest rates, as long as there is available credit on the credit card(s) to which the balances are being transferred. In this manner, a transfer may be made from the highest interest rate credit card(s) to the lowest interest rate credit card(s).

Exemplary Computing Arrangement

Figure 5:
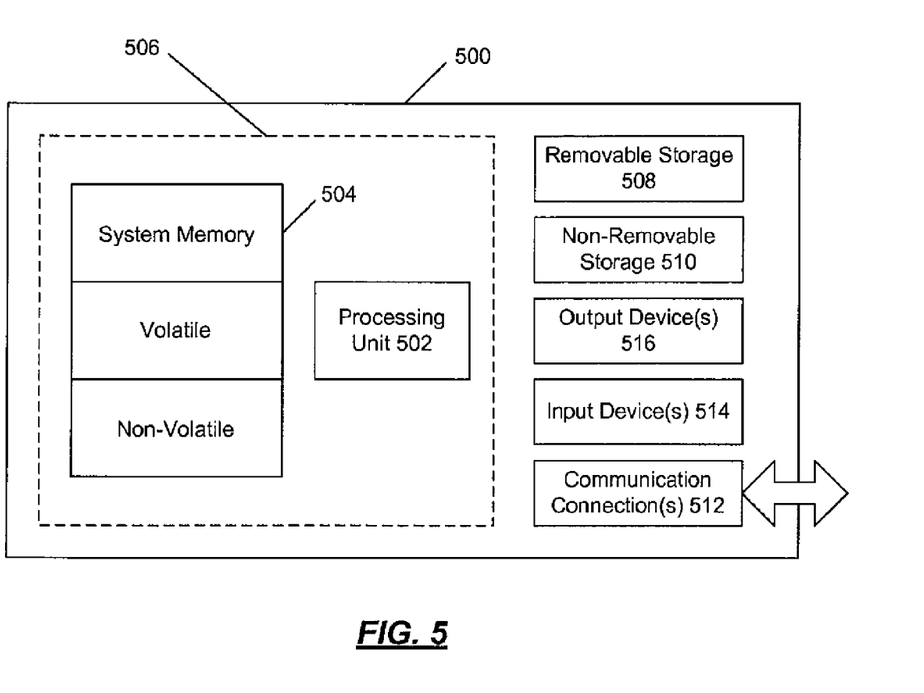
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and system memory 504. Depending on the exact configuration and type of computing device, system memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by computing device 500 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 504, removable storage 508, and non-removable storage 510 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also contain communication connection(s) 512 that allow the computing device 500 to communicate with other devices. Communication connection(s) 512 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An account shadowing method, wherein a non-transitory computer-readable medium comprising computer-readable instructions that, when executed, perform the method, comprising:
   selecting a predetermined type of transaction data to allow a charge associated with the predetermined type to be paid by a transfer of a balance, wherein the predetermined type of transaction data is a transaction above a threshold value;
   determining a charge on a first account of a user is associated with the predetermined type of transaction data via a computing device;
   determining a balance on the first account of the user for the predetermined type of transaction data via the computing device; and
   transferring the balance on the first account of the user for the predetermined type of transaction data to a second account.

2. The method of claim 1, wherein determining the balance on the first account comprises monitoring the first account continuously or periodically.

3. The method of claim 1, wherein the predetermined type of transaction data is associated with a particular vendor.

4. The method of claim 1, wherein the predetermined type of transaction data is associated with a particular product.

5. The method of claim 1, wherein the first account provides an incentive for making the charge on the first account.

6. The method of claim 1, wherein the method includes determining the charge on the first account of the user is associated with the predetermined type of transaction data and determining the balance on the first account of the user for the predetermined type of transaction data using an aggregator.

7. A non-transitory computer-readable medium comprising computer-readable instructions for credit account shadowing, said computer-readable instructions when executed cause a computing device to:
   determine a balance on a first credit account of a user is to be paid by a transfer of the balance, wherein the first credit account provides an incentive for making a charge on the first credit account;
   determine an amount of available credit on a second credit account of the user;
   transfer a first portion of the balance from the first credit account to the second credit account, wherein the first portion of the balance from the first credit account is an amount that is less than or equal to the amount of available credit on the second credit account; and pay a second portion of the balance from the first credit account using another funding source, wherein the second portion of the balance from the first credit account is an amount that is a difference between the balance from the first credit account and the first portion of the balance from the first credit account that was transferred to the second credit account.

8. The non-transitory computer-readable medium of claim 7, wherein the instructions that determine the balance on the first credit account comprise instructions that monitor the first credit account continuously or periodically.

9. The non-transitory computer-readable medium of claim 7, wherein the another funding source is a checking account.

10. The non-transitory computer-readable medium of claim 7, further comprising instructions that transfer a third portion of the balance from the first credit account to a third credit account of the user, wherein the third portion of the balance from the first credit account is an amount that is a difference between the balance from the first credit account and a sum of the first and second portions of the balance from the first credit account.

11. The non-transitory computer-readable medium of claim 7, wherein the another funding source is a savings account.

12. The non-transitory computer-readable medium of claim 7, wherein the another funding source is an equity line of credit.

13. The non-transitory computer-readable medium of claim 7, wherein the second credit account has a lower interest rate than the first credit account.

14. A non-transitory computer-readable medium comprising computer-readable instructions for credit card account shadowing, said computer-readable instructions when executed cause a computing device to:
 select a predetermined type of transaction data to allow a charge associated with the predetermined type to be paid by a transfer of a balance, wherein the predetermined type of transaction data is associated with a particular vendor;
 determine the charge on a first credit card of a user is associated with the predetermined type of transaction data;
 determine a balance on the first credit card of the user for the predetermined type of transaction data;
 determine an amount of available credit on a second credit card of the user;
 transfer a first portion of the balance from the first credit card to the second credit card, wherein the first portion of the balance from the first credit card is an amount that is less than or equal to the amount of available credit on the second credit card; and
 pay a second portion of the balance from the first credit card using another funding source, wherein the second portion of the balance from the first credit card is an amount that is a difference between the balance from the first credit card and the first portion of the balance from the first credit card that was transferred to the second credit card.

15. The non-transitory computer-readable medium of claim 14, further comprising instructions that transfer a third portion of the balance from the first credit card to a third credit card of the user, wherein the third portion of the balance from the first credit card is an amount that is a difference between the balance from the first credit card and a sum of the first and second portions of the balance from the first credit card.

16. The non-transitory computer-readable medium of claim 14, wherein the another funding source is a savings account.

17. The non-transitory computer-readable medium of claim 14, wherein the another funding source is an equity line of credit.

* * * * *